US006547859B1

(12) United States Patent
Mullhaupt et al.

(10) Patent No.: US 6,547,859 B1
(45) Date of Patent: Apr. 15, 2003

(54) PROCESS FOR MAKING MICROPOROUS MEMBRANES HAVING SELECTED GAS-SELECTIVE SITES AND THE MEMBRANES SO MADE

(75) Inventors: Joseph Timothy Mullhaupt, Williamsville, NY (US); Neil Andrew Stephenson, East Amherst, NY (US); Frank Notaro, Amherst, NY (US); Ravi Prasad, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/716,262

(22) Filed: Nov. 21, 2000

(51) Int. Cl.⁷ .............................................. B01D 53/22
(52) U.S. Cl. ......................... 96/4; 95/51; 95/54; 96/10; 55/524; 55/DIG. 5
(58) Field of Search ................................. 95/43, 45, 51, 95/54; 96/4, 10–14; 55/524, DIG. 5

(56) References Cited

U.S. PATENT DOCUMENTS

| 4,472,175 A | * | 9/1984 | Malon et al. ................... 95/51 |
| 4,767,422 A | | 8/1988 | Bikson et al. ................. 55/16 |
| 4,871,494 A | * | 10/1989 | Kesting et al. ............. 96/10 X |
| 5,045,357 A | * | 9/1991 | Motonaga et al. ........... 96/12 X |
| 5,104,425 A | | 4/1992 | Rao et al. ..................... 55/16 |
| 5,147,424 A | * | 9/1992 | Tsuchida et al. ............. 95/54 X |
| 5,229,465 A | | 7/1993 | Tsuchida et al. .......... 525/326.2 |
| 5,378,440 A | * | 1/1995 | Herbst et al. ................ 95/45 X |
| 5,411,580 A | | 5/1995 | Tsuchida et al. .................. 96/5 |
| 5,650,479 A | * | 7/1997 | Glugla et al. ................ 95/43 X |
| 5,700,375 A | * | 12/1997 | Hagen et al. ................ 95/45 X |
| 5,945,079 A | | 8/1999 | Mullhaupt et al. .......... 423/219 |
| 6,051,517 A | * | 4/2000 | Funke et al. ................. 95/45 X |
| 6,139,603 A | * | 10/2000 | Boisselier-Cocolios et al. .......................... 95/54 X |

FOREIGN PATENT DOCUMENTS

JP  60-064601 A  * 4/1985  .................... 96/12

OTHER PUBLICATIONS

K. Keizer et al., "Gas Separation Mechanisms in Microporous Modified γ–$Al_2O_3$ Membranes", *Journal of Membrane Science*, 39 (1988) 285–300.

* cited by examiner

*Primary Examiner*—Robert H. Spitzer
(74) *Attorney, Agent, or Firm*—Robert J. Follett (57) ABSTRACT

A process for making microporous membranes that incorporate selected gas selective species as surface sites in a controlled spacing and orientation manner and such membranes so formed being suitable for separating and purifying the selected gas from selected gas containing gas mixtures. An example is the use of oxygen selective transition element complexes (TECs) as surface sites for separating and purifying oxygen from oxygen-containing gas mixtures.

35 Claims, 6 Drawing Sheets

FIG. 1

A – Surface Attachment Group

S – Site for TEC Interaction

FIG. 2(a)  FIG. 2(b)

DIm6

PROCESS FOR MAKING MICROPOROUS MEMBRANES HAVING SELECTED GAS-SELECTIVE SITES AND THE MEMBRANES SO MADE

BACKGROUND OF THE INVENTION

1. Field of the Invention

The invention relates to a process for making microporous membranes that incorporate selected gas selective sites. Examples of selected gas selective sites include selective transition element complexes (TEC's) for oxygen, amines and/or exposed cations for carbon dioxide, and copper(I) and/or silver(I) sites for carbon monoxide. The selected gas selective sites are incorporated onto internal surfaces of porous membranes in a controlled spacing and orientation manner and such resulting microporous membranes being suitable for separating and purifying selected gas from the selected gas containing gas mixtures. The invention also relates to the microporous selective membranes so made.

2. Description of the Prior Art

For many years, air has been separated and purified by cryogenic distillation, for which operating temperatures are set by the vapor-liquid equilibria of the liquefied mixture. Cryogenic separation is capital intensive, particularly for production rates below several hundred tons per day. Alternative technologies compete in the marketplace particularly for air separations to produce oxygen and nitrogen at lower purities and lower production rates than cryogenic systems. Pressure swing adsorption (PSA) has been applied to air separation and purification at near ambient temperature using either gas-solid equilibria or differences in uptake and release rates between adsorbates for a given adsorbent. Gas separation using membrane systems takes advantage of differences in permeation rates for the different feed components. Process aspects of membrane gas separation are simpler than either cryogenic or PSA systems.

Conventional air separation using membrane systems employs thin polymeric coatings which exhibit permselectivity for one or more components of the feed. For air separation, the primary concern is the separation of oxygen and nitrogen with the selectivity for other feed components such as water and carbon dioxide playing a lesser role. Advances in membrane materials have relied on the identification and utilization of polymers showing increased selectivity and permeability, combined with improvements in coating technology to give thinner separation layers.

Certain transition element complexes possess sites which show high selectivities for oxygen over nitrogen, argon, and other air components. Several attempts have been made to incorporate oxygen selective TEC sites into membrane systems to give rise to facilitated oxygen transport. Alternative approaches have been utilized such as those which are supported liquid membranes where the TEC sites function as mobile carriers or dense polymer membranes or microporous membranes where the TEC's serve as fixed sites. For example, a membrane containing Co(3-MeOsaltmen) in γ-butyrolactone containing 4-(N,N-dimethylamino)pyridine (DMAP) at −10° C. showed a selectivity $\alpha(O_2/N_2)$ >20 with an oxygen permeability of 260 Barrer. Several problems have been identified which restrict or limit the application of supported liquid membranes to air separation. These include practical restrictions such as solubility limits for the TEC, membrane thickness, and low carrier mobility. In addition, decline in membrane performance can occur by irreversible TEC oxidation, evaporation loss of the liquid medium, and contamination of the liquid membrane with minor atmospheric components.

Permeation within polymeric materials can be described by a combination of diffusional and solubility effects. The incorporation of TEC's into polymeric substrates has been disclosed to improve oxygen transport through solubility enhancement. Several alternative configurations have been examined such as examples where the TEC/axial base is physically incorporated in the polymer, or where the TEC and/or axial donor are covalently linked to the polymer.

Permeation studies for dense polymer membranes containing TEC's have indicated that the increasing oxygen permeability with decreasing upstream oxygen pressure is consistent with facilitation. For example, permeation studies at 35° C. for polybutylmethacrylate containing 4.5 wt. % 1-MeIm/Co($T_{piv}$PP), where 1-MeIm refers to 1-methylimidazole and Co($T_{piv}$PP) refers to meso-tetra (α,α,α,α-o-privalamidophenyl) porphyrinato-cobalt(II), indicated a P($O_2$) of 23 Barrer with selectivity $\alpha(O_2/N_2)$ of 12 at 5 mmHg upstream pressure and lifetimes on the order of months.

Oxygen facilitation in styrene-butadiene-vinylpyridine graft copolymers, and epoxidized styrene-butadiene block copolymers containing TEC's have been disclosed in the prior art. Pressure dependent oxygen permeation with $\alpha(O_2/N_2)$ up to 6.2 and P($O_2$) 29.4 Barrer with an upstream pressure of 50 mmHg have been reported. Permeation studies for polyhexylmethacrylate-co-vinylpyridine containing N,$N^1$-bis(salicylidene)ethylenediaminocobalt(II) (abbreviated as Co(salen)) prepared by an interfacial reaction between a polymer solution and a TEC impregnated in a porous membrane have been reported. Selectivities over 20 were reported with an oxygen permeation rate of 3.12× $10^{-8}$ cm$^3$/cm$^2$/s cmHg at 100 torr upstream pressure. In an alternative approach, a rigid porous support for butylacrylate-co-vinylimidazole membranes containing Co($T_{piv}$PP) have provided permeation measurements indicating $\alpha(O_2/N_2)$ of 16.

Gas separation membranes consisting of TEC's related to Co(salen) and DMAP physically incorporated in polysulfone which exhibit facilitated oxygen transport have been disclosed. A dry/wet phase inversion process was utilized to give thin separation layers and to prevent TEC crystallization. The stability of the separation membranes have been found to be satisfactory over 3 months using either a synthetic air or a compressed air feed. The highest selectivity reported corresponds to asymmetric membranes containing 15.1 wt. % Co(5-$NO_2$-salen) which gives $\alpha(O_2/N_2)$ of 23.46.

Carbon molecular sieve (CMS) membranes have been prepared by controlled carbonization of polymeric substrates, and permit gas separations on the basis of molecular dimensions. For the separation of components with similar kinetic diameters such as oxygen and nitrogen, fine control of the pore size distribution of the CMS membranes is generally required.

There are several examples of microporous membranes where surface diffusion plays a significant role in transport including the transport of organic vapor mixtures through porous glass, and gas permeation for porous glass modified using tetraethoxysilane. The transport of pure gases and binary gas mixtures through microporous composite membranes based on alumina have shown surface diffusion of carbon dioxide with a surface diffusion coefficient estimated to lie in the range $2\times10^{-5}$ to $5\times10^{-5}$ cm$^2$/sec.

U.S. Pat. No. 5,104,425 describes porous membranes incorporating a adsorbent which separate gas mixtures by virtue of the selective adsorption of at least one primary component. The adsorbed component diffuses by surface flow in the adsorbed phase due to concentration gradients created by a pressure difference across the membrane. Pore diameters, for the substrate described in the patent should be between 0.1 and 50 μm, and the thickness of the active layer containing porous adsorptive material should be <201 μm. The incorporation of porous adsorbent coatings involves introduction of an adsorbent precursor, heating to convert the precursor to the porous adsorbent, and cooling. Methods for the modification of the porosity of the adsorptive layer are disclosed, together with post-treatments for the sealing of defects using a thin layer (<1 μm) of high permeability, low selectivity polymer such as a silicon containing polymer. Permeation measurements, for example of an adsorbent membrane at 25° C. indicate a($CO_2/H_2$) of 7.1 and a $CO_2$ permeability of 3360 Barrer.

Oxygen separating porous membranes have been disclosed in the prior art where oxygen-selective TEC's are retained in the pores of a porous substrate to give membranes with free pore diameters from 3.5 to 100 Å. An additional donor required to provide five-coordinate deoxy TEC sites is provided by aromatic heterocycles either from copolymers of vinyl aromatic heterocycles and alkylacrylates or -methacrylates, or from low molecular weight aromatic heterocycles. High oxygen selectivities were reported due to rapid adsorption and desorption of oxygen at TEC sites resulting in oxygen surface flow. For example, mixed gas permeation measurements using 2.6% oxygen in nitrogen as feed for a membrane consisting of Co($T_{piv}$PP) and poly(N-vinylimidazole-co-octyl methacrylate) (POMIm) supported in Vycor 7930 porous glass, indicate an α($O_2/N_2$) 7, with P($O_2$) 41,000 Barrer.

Although supported liquid membranes containing TEC's as mobile carriers have shown promising permeation characteristics on a laboratory scale, they are not useful for practical gas separation. Several concerns have been identified for these systems. These include practical restrictions such as solubility limits for the TEC, membrane thickness, and low carrier mobility. In addition, decline in membrane performance has been observed due to irreversible TEC oxidation, evaporation loss of the liquid medium, and contamination of the liquid membrane with minor atmospheric components. The microporous oxygen selective membranes described in the subject invention are solid systems which avoid solubility, mobility, and stability concerns.

The application of dense polymer membranes containing TEC's for gas separation are disclosed in the prior art. As in the case of simple polymer membranes, the membranes can incorporate TEC's which separate gases on the basis of differential solubility and diffuisivity of gases within the material. Although promising permeation characteristics (oxygen selectivity and permeability) has been reported, membranes containing TEC's have not been applied to commercial separations due to a number of factors. The ability to produce thin polymer films containing TEC's which are mechanically stable and which contain low defects has not been demonstrated. For example, high TEC contents have been found to result in more brittle materials. In addition, current methods used to produce polymer membranes containing TEC's for gas separation do not adequately control TEC spacing to prevent unfavorable processes including bimolecular decomposition pathways which are known to occur in liquids.

Liquid membranes containing TEC's have shown interesting properties but have not proven useful for air separation due to irreversible TEC oxidation, evaporation loss of the liquid medium, and contamination of the liquid membrane with minor atmospheric components.

U.S. Pat. No. 5,411,580 discloses an oxygen-separating porous membrane comprising a complex of (a) a transition metal (II) ion, (b) a ligand, and (c) an aromatic heterocycle, retained in the pores of a substrate.

U.S. Pat. No. 5,229,465 discloses an oxygen-permeable polymeric membrane, intended for use in processes for producing oxygen- or nitrogen-enriched air for industrial, medical, and other applications, are characterized by a complex which comprises (a) a copolymer of a vinyl aromatic heterocycle and either (i) a fluoroalkyl acrylate or (ii) a fluoroalkyl methacrylate, and (b) a ligand taken from the group consisting of (1) porphyrins, (2) Schiff bases, (3) cyclidenes, and (4) amine-like macrocycles, and (c) a transition metal (II) ion.

U.S. Pat. No. 5,945,070 discloses a process for air separation using oxygen-selective sorbents with enhanced selectivity, loading capacities and oxygen uptake rates have a transition element complex in solid form supported on a high surface substrate. The transition element complex is substantially uniformly spaced, and includes a transition element ion accessible to an oxygen-containing gas stream during use in the separation of oxygen from an oxygen-containing gas mixture such as air.

It will be appreciated, therefore, that further improvements in the art are needed to enable membrane processes to satisfy the requirements of the art. In particular, further improvements are desirable with respect to transition element complexes in order to enhance the use thereof as oxygen-selective sites, especially solid TEC's in supported form in which the spacing and orientation of the TEC sites are controlled. Similarly, selected gas selective sites can be chosen for separation of selected gas from its mixtures.

It is an object of the present invention to provide a process for producing a microporous membrane system which combine high permeabilities and selectivities for selected gases through the provision of selected gas selective sites for active surface diffusion.

It is another object of the present invention to provide a process for producing microporous selected gas selective membranes that incorporate selective sites for selected gases in which the spacing and orientation of the sites are controlled.

It is another object of the present invention to provide a microporous oxygen selective membrane containing TEC sites which are oxygen selective at equilibrium.

SUMMARY OF THE INVENTION

The invention relates to a process for producing a selected gas-selective microporous membrane and the membrane so produced and such membrane having a surface diffusion of a selected gas using selective sites which are selective at equilibrium employing reversible chemisorption and wherein said microporous membrane has a pore size of less than about 25 Å and said selected gas selective sites have a footprint of less than about 200 (Å)$^2$ and preferably having selected gas surface diffusion coefficients greater than $1 \times 10^{-5}$ cm$^2$/s and preferably a thickness of less than about 2000 Å.

BRIEF DESCRIPTION OF THE DRAWING

FIG. 2—Schematic representation of linking agent on a surface of a substrate, with FIG. 2a) representing amplifying and FIG. 2(b) representing non-amplifying.

FIG. 4—Schematic representation of oxygen selective TEC sites with FIG. 4(a) being organized and 4(b) being non-organized.

DETAILED DESCRIPTION OF THE INVENTION

As used herein, the term "footprint" shall mean the average surface area required for each selected gas (adsorbate) molecule. Knowing the footprint area, the spacing between adsorption sites or regions can be obtained. The term "site footprint" is used to represent the area occupied by individual selective sites. A limiting case occurs for close-packed arrangements of sites where the site footprint corresponds to the maximum cross-section in a plane parallel to the support and is equivalent to the footprint (average surface area required for each selected gas molecule). However, examples are also considered where the sites are not close-packed and the footprint corresponds to an average area occupied by individual sites. For selected gas selective site coatings, the footprints used represent average surface areas occupied by adsorbates in monolayer coatings based on adsorption measurements. For some embodiments, selected gas selective sites may be part of a larger molecule, particularly for amplifying linking agents. In this case, the term footprint represents the average area occupied by adsorbate, and the value may be smaller than the molecular footprint.

The substrate utilized for the formation of microporous selected gas selective membranes is used to provide structural integrity, a surface for the deployment of selective groups, and may also serve as a heat sink to dissipate heat associated with adsorption and transport processes. The substrate should be available in membrane form (flat sheet, tubes, hollow fibers) and possess porosity throughout the cross-section. The separation region itself in microporous selected gas selective membranes may be present only in regions of the substrate. The substrate should be chemically inert with respect to site degradation in either bound or unbound states.

Control of the free pore diameter and pore size distribution in modified substrates (i.e. after incorporation of selective sites) is required to prevent dominant transport by non-selective or weakly selective pathways. Mean pore diameters for the coated substrate below 25 Å are preferred combined with narrow pore size distributions. The preparation of microporous selected gas selective membranes using preformed substrates requires a mean pore size and pore size distribution amenable to the transport of selected gas selective sites (such as TEC's for oxygen) to interior regions. For polymeric substrates, swelling agents can be utilized to facilitate transport of the selective sites to interior regions. Suitable swelling agents can be selected from the group comprising alcohols, hydrocarbons, and dipolar aprotic solvents such as N,N-dimethylformamide (DMF).

The surface characteristics of a support that can be used to assist in the organization of selective sites, are linking agents which can give close-packed oriented monolayer coatings. The term "linking agent" is used here to describe molecular species containing at least two functional sites which are designed or selected to serve as an interface between selective sites and the surface of a substrate. For example, diazabicyclo[2.2.2]octane is viewed as a linking agent since it can interact simultaneously with an acidic surface and a four-coordinate deoxy TEC.

Examples of typical preformed substrate for the preparation of microporous oxygen selective membranes include porous glasses (sol-gel or acid-leached), zeolite membranes, anodized alumina membranes, and porous carbons. Porous polymeric compositions may also serve as useful substrates and examples include crosslinked polymers and copolymers, phase separated polymers and porous condensation polymers such as polyamides and polyamides. For polymeric substrates the TEC sites are located on pore walls and the requirements for free pore diameter and pore size distribution are the same as for inorganic substrates. However, gas diffusion through dense polymer regions would be slow. Porous polymers and copolymers containing potential axial donors (e.g. polyvinylpyridine type or polyvinylimidazole type) or groups which incorporate or are easily modified to provide potential axial donors can be used.

Various substrate configurations are suitable including flat disk, tube, spiral wound, and hollow fiber. The selection of substrate configuration will depend on the particular application and fabrication concerns. Pretreatment of the substrate may be necessary to remove water or other adsorbed species using methods appropriate to the substrate and the adsorbate. Examples of absorbed species are water, alcohols, porogens, and surfactant templates.

The nature of the selective sites chosen will depend on the identity of the selected gas. This is illustrated for example where the selected gas is oxygen. Certain transition element complexes (TEC's) have been shown to interact exclusively with oxygen over nitrogen and argon, and $CO_2$ based on solution or solid state studies. These oxygen selective TEC's preferably provide the preferred embodiment for the oxygen surface transport and selectivity in microporous oxygen selective membranes of the subject invention. The solid state deployment of TEC's results in two advantages over TEC's in the liquid phase. First, immobilization and spacing of TEC's in the solid state avoid deactivating reactions, such as bimolecular oxidations, which occur readily in solution. Secondly, solid state deployment circumvents conflicting compromises that must be made in choosing a solvent such as high TEC solubility, low solvent vapor pressure, low viscosity, and safety concerns associated with use at relatively high oxygen concentrations.

Figure 1:
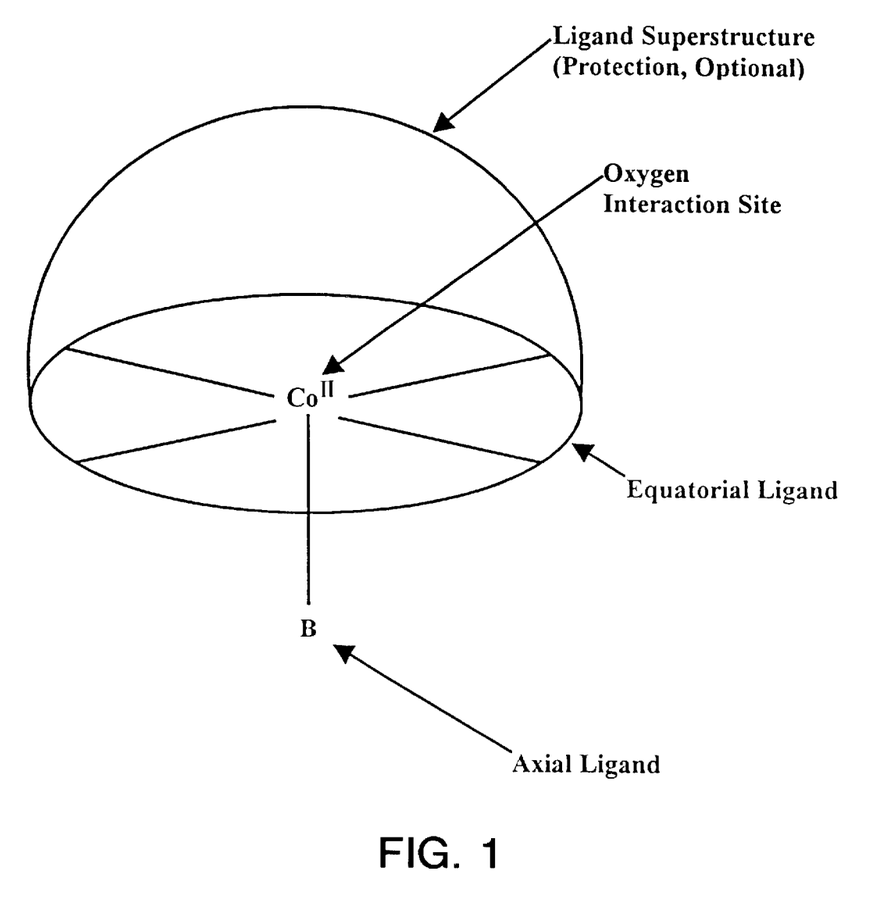
FIG. 1—Schematic representation of an oxygen selective cobalt (II) TEC based on a tetradentate primary ligand.

The transition element complexes (TEC's) preferred for the subject invention for oxygen are the transition element complexes which have selective interactions with molecular oxygen involving reversible chemisorption. A general representation of a suitable TEC based on a tetradentate and a monodentate donor to cobalt(II) is shown in FIG. 1. Two components are required for a TEC to function as an $O_2$-selective compound: (1) a transition metal ion, (2) a polydentate ligand which chelates the transition metal ion. Additional donors may also be required to provide a five-coordinate deoxy transition metal ion which is preferred for oxygen interaction in a superoxo mode. Examples of useful TEC composition classes include five-coordinate complexes containing cobalt or iron ions embedded in tetradentate Schiff bases or porphyrins to which are attached axial bases such as derivatives of imidazole or pyridine. Suitable combinations for use in the subject invention contain the following components: (1) metal ions: cobalt(II), iron(II), copper(I), and mixtures thereof, (2) ligands: porphyrins, Schiff bases, polyamines, polyoxoamides, oximes and their derivatives, and cyclidenes, and (3) axial bases: nitrogen, sulfur, oxygen, heterocycles, thioethers, pyridine, imidazole, amines, epoxides, ethers and their derivatives, Preferred embodiments include appropriate combinations of the following: (1) cobalt(II) and the metal ion, (2) picket-fence porphyrin and related porphyrin dianions as ligands, low molecular weight ligands such as salen and related Schiff bases, and tetraazaannulene ligands, and (3) axial bases of N-substituted imidazoles and 3- and/or 4-substituted pyridines as axial bases, and tertiary amines.

When the selected gas is carbon dioxide, selective sites include amines (primary, secondary, and tertiary), and exposed cations. When the selected gas is carbon monoxide or an olefin, selective sites include copper(I) and silver(I) either adsorbed on surfaces, or present in a chelating ligand.

A function of the selected gas selective sites in microporous selected gas selective membranes is to provide equilibrium selectivity for active surface transport of the selected gas. This is illustrated for a microporous oxygen selective membrane involving active surface transport of oxygen. Simulations using a conduit pore model have indicated that the oxygen equilibrium coefficient of TEC sites, and the TEC site footprint represent important TEC selection parameters. The desired performance of a given membrane will rely on matching the structure and composition of the TEC and its associated axial base with the oxygen concentration and pressure of the feed, and with the provision of rapid surface transport rates. The intrinsic reaction rates for oxygen at the TEC sites are generally very fast, based on evidence from laser flash photolysis spectroscopy and from reactions in solution.

Preferably, the selected gas selective sites are deployed so that the sites are distributed essentially as monolayers attached to either concave or convex internal surfaces of microporous membrane surfaces. A novel feature of the subject invention is the linking agents to attach the selected gas selective sites to support surfaces as monolayer coatings which are oriented with respect to the surface.

A preferred embodiment of the subject invention is the use of linking agents (if required) to control the selected gas selective site concentration and spacing, and to orient the selective sites with respect to the surface of the substrate. The term "linking agent" is used to describe molecular species containing at least two functional sites which are designed or selected to serve as the selective sites or as an interface between selective sites and the surface of a substrate. Two advantages over earlier methods for deploying selected gas selective sites are (1) one method that yields selected gas selective site distributions that are more uniformly spaced at distances that correspond to high surface coverage and (2) another method that provides for ready access of selected gas to the selective sites. These advantages derive from the chemical structure of linking agents. The linking agent can be a separate species, part of the selected gas selective site, or part of the support particle, as in the case of an organic polymer support. The linking agent can be attached to the support by means of various interactions, including covalent bonds and acid-base interactions. Selected gas selective sites may be attached to the linking agents in several ways. For example, a particularly efficient way to attach TEC's that infer oxygen selectivity to a substrate is through the axial base. For this mode of attachment of oxygen selective sites, the best configuration of TEC's in a supported monolayer that is a dense side-by-side array of TEC's oriented with the axis defined by the $O_2$-metal-axial base bonds normal to the surface, so that the $O_2$ binding sites face away from the support surface. In general, the choice of functionality present in linking agents will be dependent on substrate surface groups and the selection of selected gas selective sites. For example, a linking agent bearing acidic groups could be employed for a substrate containing basic groups. Other interactions can also be exploited including H-bonding, electrostatic, and covalent bonding.

Figure 2A:
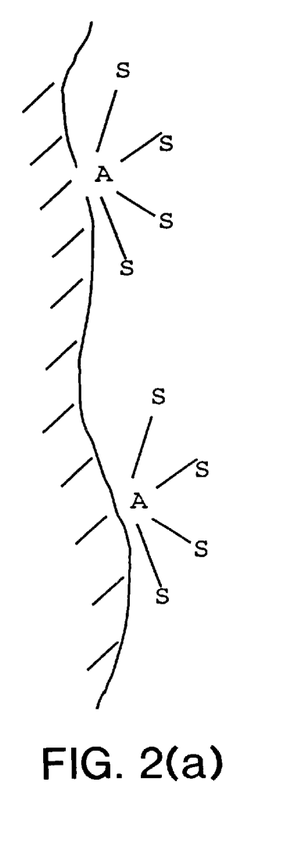
Figure 2B:
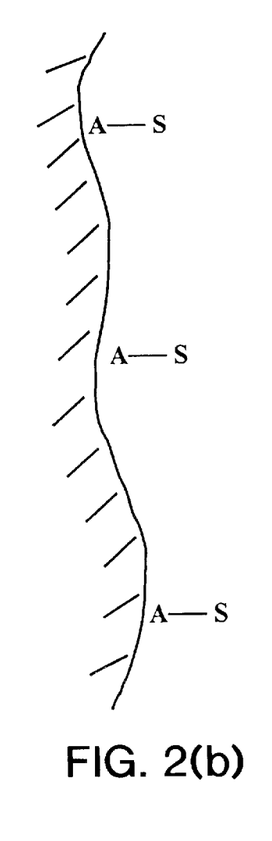

Two categories of linking agents are identified as components of selected gas selective microporous membranes—linear (non-amplifying) linking agents, and amplifying linking agents. The term non-amplifying ("linear") linking agents indicates linking agents where the number of selected gas selective sites available is less than or equal to the number of interaction sites or regions with the support. Surface amplifying linking agents are defined as linking agents where the number of selected gas selective sites associated with each linking agent is greater than the number of surface interaction sites. Schematic representations of each category are shown in FIG. 2. Use of amplifying and non-amplifying linking agents is illustrated for oxygen selective microporous membranes where the selected gas selective sites are TECs. A convenient configuration for both classes of linking agents for oxygen selective microporous membranes occurs when the linking agent provides a Lewis base group to serve as an axial donor to a transition metal center to give an oxygen-selective TEC. For example, the modification of surfaces by commercial silane coupling agents, $X_3SiRY$, has been disclosed wherein X is a group for attachment to mineral surfaces, Y is an organic functional group, and R is a hydrocarbon group. This example represents non-amplifying covalent attachment at multiple sites, and examples of coupling agents include $(EtO)_3SiCH_2CH_2CH_2NH_2$ and $(MeO)_3CH_2CH_2CH_2NHCH_2CH_2NH_2$.

Alternative examples of linear linking agents which provide Lewis base groups to give oxygen-selective TEC sites but do not involve surface modification in a covalent manner include substituted heterocycles where the functionality is selected for interaction of aminoalkylpyridines or aminoalkylimidazoles with an acidic support. The linking agent can also be selected where the functional groups used for interaction with the surface and the transition metal center are the same. Examples of this class include 1,4-diazabicyclo[2.2.2]octane and hexamethylenetetramine. These cage structures orient the Lewis base donor and hence TEC sites with respect to the surface due to steric considerations.

Amplifying linking agents can be used as chemical species where the number of TEC's associated with each linking agent is greater than the number of surface interactions sites. Typically, the amplifying linking agent provides two or more Lewis base sites (such as pyridine or imidazole derivatives) capable of binding TEC's to promote reversible oxygenation. There could be one or more sites capable of interacting with the surface of a support to attach and orient the linking agent and TEC(s) with respect to the local surface. The amplifying linking agents generally contain one or more branching points so that steric effects serve to orient the Lewis base groups away from the surface. Amplifying linking agents lead to advantages relative to linear linking agents. They provide more effective control of supported TEC reactivity, improved control of TEC spacing, and greater ease of attachment of TEC's to a support surface. In addition, they can be utilized with support surfaces which possess only a small population of interaction sites per unit area. Steric effects favor the projection of terminal groups away from the surface so that TEC orientation is accomplished.

The structure and composition of the amplifying linking agent is highly versatile and is not restricted to oxygen selective sites. For example, amine terminal groups on amplifying linking agents will provide selectivity for carbon dioxide. Variations can conveniently be made to one or more of the following features: the core (including functionality present and multiplicity); the multiplicity of branching points; the nature of linking arms; the functionality present and reactions types; and the structure and substitution patterns of terminal groups. The TEC units can be either incorporated as part of the amplifying linking agent (covalently attached to the ligand periphery) or the linking agent can provide Lewis base donors which interact with transition metal chelates in an axial manner to give oxygen selective TEC's. In the latter category, the Lewis base groups are typically nitrogen, sulfur or oxygen heterocycles, amines, ethers or thioethers. Specific examples of terminal groups include substituted pyridines and substituted imidazoles.

Figure 3:
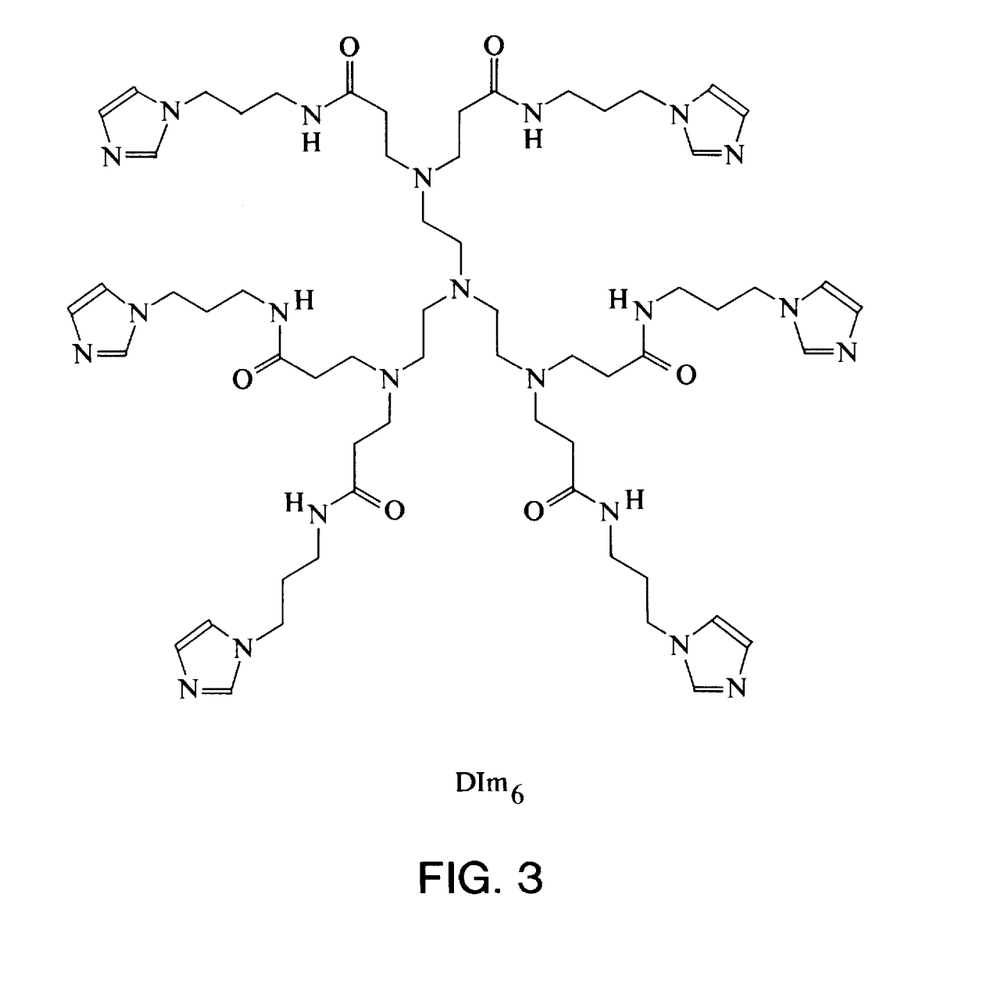
FIG. 3—Schematic representation of an amplifying linking agent.

Examples of amplifying linking agents bearing Lewis base groups are provided by modified dendrimers, particularly the low generation examples. Modifications to dendrimer structures to provide terminal Lewis base groups suitable for interaction with TEC's are accomplished using synthetic transformations used in dendrimer growth but with alternative reagents. An amplifying linking agent designated $DIm_6$ (defined in FIG. 3) has been prepared using tris(aminoethyl)amine as a core; methyl acrylate for branching, and an aminoalkyl-substituted heterocycle to provide terminal groups. Related structures are possible where the core and the composition of the terminal unit (heterocycle, linking arm) are varied. Studies involving the interaction of $DIm_6$ with silica gel using uptake and porosity measurements are consistent with coating of internal surfaces. The availability of imidazole groups for coordination to TEC sites is inferred by oxygen sorption studies after the TEC coating is formed.

Both non-amplifying and surface amplifying linking agents as components of any microporous oxygen selective membrane with any TEC and/or substrate are suitable for use in the subject invention. A specific example of linking agent utilization occurs when the linking agent provides a Lewis base donor for axial coordination to a transition metal chelate to give an oxygen selective TEC.

Preparation Using Existing Membrane Substrates

The coating of pre-existing membrane substrates with selected gas selective sites can be accomplished with or without the intervention of a linking agent. Examples where the linking agent is not required include the ion-exchange of cationic selected gas selective sites with ion exchangeable units on the internal surface of a microporous membrane substrate. More typically, a preformed membrane substrate is combined with a linking agent and the selected gas selective site such as a TEC for oxygen. This can be performed either in one step (simultaneous method) or in two steps (sequential method). Both methods have been utilized for the preparation of coated particles involving inorganic supports. In both cases, pretreatment of the substrate was performed to remove water or other adsorbed species using methods appropriate to the substrate and the adsorbate. The coating procedures for ions or molecules containing selected gas selective sites should be performed under controlled conditions. For example, oxygen selective TECs should be coated under anaerobic conditions. Solvents are selected based on solubility and compatibility with ions or molecules containing selected gas selective sites and other components. For sequential methods, it is desirable to use solvents where the linking agent shows a substantially lower solubility than the ions or molecules containing selected gas selective sites.

The simultaneous coating method involves contacting the membrane substrate with a solution containing ions or molecules containing selected gas selective sites or their precursors and other required components including linking agent. The quantities of coating components are controlled so that monolayer formation occurs. Solvent removal is used to deposit a layer of the selected gas selective sites (and linking agent if present) onto the support surface.

The sequential coating method is used to deposit a monolayer of linking agent onto the support surface in an initial step. This method is preferred when there is significant interaction strength between the linking agent and the substrate. The linking agent is coated onto the substrate by adsorption from a solution containing an excess of the linking agent, followed by contacting the coated substrate with a solution containing ions or molecules containing selected gas selective sites under conditions where extraction of the linking agent from the surface is minimized.

The depth of the selected gas selective sites coated regions in both simultaneous and sequential coating method can be controlled by adjusting the method by which the membrane substrate and solutions are contacted (dependent on substrate configuration). For example, the use of hollow fiber substrates allows immersion procedures so that a single face of the substrate comes in contact with the ions or molecules containing selected gas selective sites and/or linking agent solution. Immersion time, temperature, solubility, and transport effects will determine the mobility of the selective sites in the substrate.

Preparation from Coated Small Particle Assemblies.

Two alternative routes are envisaged for the preparation of microporous selected gas selective membranes based on small particle assemblies. These are illustrated for oxygen selective membranes and TEC sites, but the methods and principles are useful for other selected gas selective sites. One approach involves the formation of small particles, coating, and membrane formation as a single process. An alternative approach involves isolation of small particles, coating, and subsequent membrane formation.

In the direct formation of TEC-coated small particle assemblies from solutions, small particle suspension can be formed using sol-gel technology and these can be utilized for the formation of porous glasses. Sol-gel technology is a general method by which controlled porosity oxides are prepared by hydrolysis and condensation of suitable precursors, typically with water and either acid or base catalysis. For example, preparation of sol-gel porous glasses incorporating biological species have been prepared using mild conditions which retain the activity of the guest molecules. Examples of guest molecules include bacteriorhodopsin, copper-zinc superoxide dismutase, cytochrome c, myoglobin, glucose oxidase, trypsin, and acid phosphotase. In addition, the incorporation of non-biological molecules has been disclosed including spiropyranes to serve as photochromic optical recording materials.

The preparation of microporous oxygen selective membranes can be performed using a sol-gel route by addition of TEC and linking agent at the small particle stage prior to membrane formation. This requires chemical compatibility of the solvents (such solvents as toluene, chloroform, dichloromethane) and small particles with the TEC's and linking agents (if used) under the conditions employed, In addition the TEC must be soluble in the solvent system of choice. For most TEC's, the application of anaerobic conditions is required, and the use of non-aqueous solvents is preferred. The application of linking agents (amplifying or non-amplifying) offers an opportunity for small particles to be coated in the liquid state prior to membrane formation.

The coated small particle sol-gel system can be used for membrane formation through technologies such as slip-casting, or can be converted to dense films by casting procedures. The coated small particle sol-gel system may also be used for incorporation on or within porous substrates. In all cases, the criteria for material characteristics apply to all separation membranes based on TEC coated small particles including TEC spacing, mean pore size, and pore size distribution, as discussed herein.

The post-treatment of membranes to minimize the effects of defects should be used in the preparation of air separation systems. For microporous membranes, it is important to select pre- or post-treatment coatings which do not substantially degrade either the flux or the selectivity of the microporous region. For this reason, thin coatings of high permeability polymers such as poly(dimethylsiloxane) (PDMS) or poly(1-trimethylsilyl-1-propyne) (PTMSP) are preferred. An additional requirement is that the pre- or post-treatment must be compatible with the TEC sites.

Figure 4A:
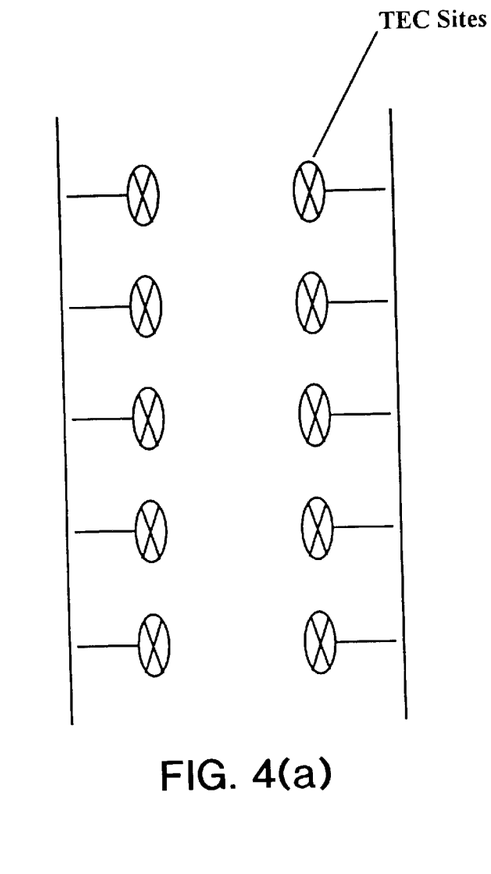
Figure 4B:
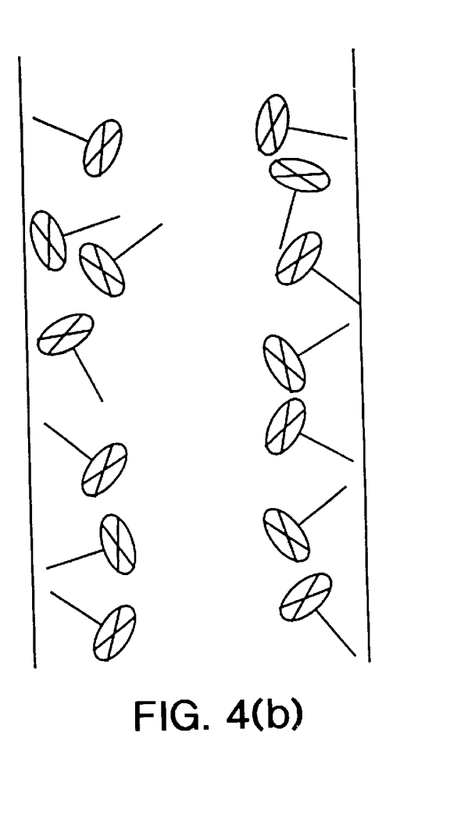

The microporous selected gas selective membranes of the subject invention combine high permeabilities with high selectivity by employing selected gas selective sites to enable surface port of the selected gas in a microporous system. The high permeabilities and high selectivity are achieved using coatings of organized selected gas selective sites which exhibit reversible chemisorption of the selected gas. This is illustrated for oxygen selective microporous membranes using TECs as active sites. For example, the general features of oxygen selective TEC's are illustrated in FIG. 1 using a combination of tetradentate donor (equatorial ligand) and a monodentate donor (axial ligand) to a cobalt (II) center. Other examples of five-coordinate deoxy TEC sites consisting of one or more chelating ligands are equally applicable and are well-known to those skilled in the art. Schematic representation of individual pores for microporous oxygen selective membranes incorporating TEC's using organized and non-organized arrangements are shown in FIG. 4.

Desirable properties for microporous oxygen selective membranes include oxygen permeabilities greater than $10^{+3}$ Barrer with selectivities $\alpha(O_2/N_2)$ over 4. Preferred properties involve oxygen permeabilities over $2 \times 10^{+3}$ Barrer with $\alpha(O_2/N_2)$ greater than 10.

Gas selective interactions with pore walls or modified pore walls can result in an enhanced transport of one or more component by surface diffusion. Computer simulation studies have been performed for microporous membranes based on a conduit model and these include contributions from multiple transport pathways (Poisseuille, Knudsen, surface diffusion). This model has been utilized to examine separation capabilities of microporous oxygen selective membranes incorporating TEC units and for comparison with systems exhibiting physical adsorption. Transport characteristics of the microporous membranes are evaluated as a function of surface diffusion coefficient, effective site or adsorbate footprint, free pore radius, and equilibrium coefficients for selective sites. For the purposes of this document, the term "footprint" is used to describe the average surface area required for each selected gas (adsorbate) molecule and hence describes the spacing between adsorption sites or regions. Values of TEC footprints and equilibrium coefficients for oxygen interaction are based on values found in the literature. For non-TEC systems, oxygen and nitrogen footprints of 14.1 and 16.2 $(\text{Å})^2$ were used, and adsorption equilibrium parameters are based on known materials. In each case, surface diffusion coefficients are based on typical values reported in the open literature ($10^{-4}$ to $10^{-5}$ cm$^2$/s) including surface diffusion of carbon dioxide in microporous alumina membranes, nitrogen diffusion in graphite powder compacts, and $CO_2$ or hydrocarbon surface transport in porous glass. The use of these values for TEC's is reasonably based on studies for the diffusion between TEC sites in polymer materials ($D_{cc} \sim 10^{-7}$ to $10^{-9}$ cm$^2$/s which includes diffusion within the polymer.

Specific examples for oxygen describing the permeation characteristics of microporous oxygen selective membranes containing TEC's obtained using the conduit model are shown in Tables 1–4. In these particular examples, surface diffusion of nitrogen is neglected.

TABLE 1

Permeation in Microporous Membranes.
Influence of Free Pore Diameter, Site
Footprint, and Oxygen Surface Diffusion
Coefficient.
PERMEATION IN MICROPOROUS MEMBRANES
CONDUIT MODEL

| Fixed Model Parameters | | | |
|---|---|---|---|
| Temperature 300K | | | $K_{14}$ = 0.05 [kPa$^{-1}$) |
| $O_2$ Pressure (kpa) | | $N_2$ Pressure (kPa) | $P_{\frac{1}{2}}(O_2)$ = 150 torr |
| Up = 20 Down = 1 | | Up = 30 Down = 0 | |

| Variable Model Parameters | | | |
|---|---|---|---|
| Free Diameter | Site Footprint | Surface Diffusion Coefficient $D_1$ (cm$^2$/sec) | |
| (Å) | (Å)$^2$ | 1 E-4 | 1 E-5 |

| PURE GAS PERMEATION & SELECTIVITY DATA | | | | |
|---|---|---|---|---|
| | | Py($O_2$) (E + 5 barrer) | $\alpha(O_2/N_2)$ | Py($O_2$) (E + 5 barrer) | $\alpha(O_2/N_2)$ |
| 5.0 | 100 | 95.41 | 100 | 10.34 | 10.87 |
| | 150 | 63.90 | 67.1 | 7.19 | 7.56 |
| | 200 | 48.15 | 50.6 | 5.61 | 5.90 |
| | 250 | 38.70 | 40.7 | 4.67 | 4.91 |
| | 300 | 32.40 | 34.1 | 4.04 | 4.25 |
| | 400 | 24.52 | 25.8 | 3.25 | 3.42 |
| 7.5 | 100 | 64.34 | 45.1 | 7.64 | 5.35 |
| | 150 | 43.34 | 30.4 | 5.53 | 3.88 |
| | 200 | 32.84 | 23.0 | 4.48 | 3.14 |
| | 250 | 26.54 | 18.5 | 3.85 | 2.70 |
| | 300 | 22.34 | 15.6 | 3.43 | 2.41 |
| | 400 | 17.09 | 12.0 | 2.91 | 2.04 |
| 10.0 | 100 | 49.04 | 25.8 | 6.50 | 3.42 |
| | 150 | 33.28 | 17.5 | 4.93 | 2.59 |
| | 200 | 25.41 | 13.4 | 4.14 | 2.18 |
| | 250 | 20.68 | 10.9 | 3.67 | 1.93 |
| | 300 | 17.53 | 9.21 | 3.35 | 1.76 |
| | 400 | 13.59 | 7.14 | 2.96 | 1.56 |

TABLE 2

Permeation in Microporous Membranes.
Influence of Free Pore Diameter, TEC Oxygen
Affinity, and Oxygen Surface Diffusion
Coefficient.
PERMEATION IN MICROPOROUS MEMBRANES
CONDUIT MODEL

Fixed Model Parameters

Temperature 300K
$O_2$ Pressure (kpa)  $N_2$ Pressure (kpa)  Site Footprint =
Up = 20  Down = 1   Up = 30  Down = 0   100 (Å)$^2$

Variable Model Parameters

| Free Diameter (Å) | TEC $P_{½}(O_2)$ (torr) | Surface Diffusion Coefficient $D_1$ (cm$^2$/sec) | | | |
|---|---|---|---|---|---|
| | | 1 E-4 | | 1 E-5 | |
| | | Py($O_2$) (E + 5 barrer) | α($O_2/N_2$) | Py($O_2$) (E + 5 barrer) | α($O_2/N_2$) |

PURE GAS PERMEATION & SELECTIVITY DATA

| Free Diameter (Å) | TEC $P_{½}(O_2)$ (torr) | Py($O_2$) (E+5 barrer) | α($O_2/N_2$) | Py($O_2$) (E+5 barrer) | α($O_2/N_2$) |
|---|---|---|---|---|---|
| 5.0 | 1.5 | 33.64 | 35.38 | 4.16 | 4.38 |
| | 7.5 | 95.41 | 100 | 10.34 | 10.87 |
| | 75 | 121.18 | 127 | 12.92 | 13.58 |
| | 150 | 95.41 | 100 | 10.34 | 10.87 |
| | 300 | 65.44 | 68.81 | 7.34 | 7.72 |
| | 750 | 33.64 | 35.38 | 4.16 | 4.38 |
| 7.5 | 1.5 | 23.17 | 16.24 | 3.52 | 2.46 |
| | 7.5 | 64.34 | 45.1 | 7.64 | 5.35 |
| | 75 | 81.53 | 57.15 | 9.34 | 6.56 |
| | 150 | 64.34 | 45.1 | 7.64 | 5.35 |
| | 300 | 44.37 | 31.10 | 5.64 | 3.95 |
| | 750 | 23.17 | 16.24 | 3.52 | 2.46 |
| 10.0 | 1.5 | 18.16 | 9.54 | 3.42 | 1.80 |
| | 7.5 | 49.04 | 25.78 | 6.50 | 3.42 |
| | 75 | 61.93 | 32.55 | 7.79 | 4.10 |
| | 150 | 49.04 | 25.78 | 6.50 | 3.42 |
| | 300 | 34.05 | 17.90 | 5.01 | 2.63 |
| | 750 | 18.16 | 9.54 | 3.42 | 1.80 |
| 12.5 | 1.5 | 15.32 | 6.44 | 3.53 | 1.49 |
| | 7.5 | 40.03 | 16.83 | 6.00 | 2.52 |
| | 75 | 50.34 | 21.17 | 7.04 | 2.96 |
| | 150 | 40.03 | 16.83 | 6.00 | 2.52 |
| | 300 | 28.04 | 11.79 | 4.81 | 2.02 |
| | 750 | 15.32 | 6.44 | 3.53 | 1.49 |
| 15.0 | 1.5 | 13.59 | 4.76 | 3.76 | 1.32 |
| | 7.5 | 34.17 | 11.97 | 5.82 | 2.04 |
| | 75 | 42.77 | 14.98 | 6.68 | 2.34 |
| | 150 | 34.17 | 11.97 | 5.82 | 2.04 |
| | 300 | 24.18 | 8.47 | 4.82 | 1.69 |
| | 750 | 13.59 | 4.76 | 3.76 | 1.32 |
| 20.0 | 1.5 | 11.75 | 3.09 | 4.38 | 1.15 |
| | 7.5 | 27.19 | 7.14 | 5.92 | 1.56 |
| | 75 | 33.63 | 8.83 | 6.57 | 1.72 |
| | 150 | 27.19 | 7.14 | 5.92 | 1.56 |
| | 300 | 19.69 | 5.17 | 5.17 | 1.36 |
| | 750 | 11.75 | 3.09 | 4.38 | 1.15 |

TABLE 3

Permeation in Microporous Membranes.
Influence of Free Pore Diameter, TEC Oxygen
Affinity, and Downstream Oxygen Pressure.
PERMEATION IN MICROPOROUS MEMBRANES
CONDUIT MODEL

Fixed Model Parameters

Temperature 300K
$O_2$ Pressure (kpa)  $N_2$ Pressure (kpa)  Site Footprint =
Up = 20  Down = 0   Up = 20  Down = 1   100 (Å)$^2$

Variable Model Parameters

| Free Diameter (Å) | TEC $P_{½}(O_2)$ (torr) | Surface Diffusion Coefficient $D_1$ (cm$^2$/sec) | | | |
|---|---|---|---|---|---|
| | | 1 E-4 | | 1 E-4 | |

PURE GAS PERMEATION & SELECTIVITY DATA

| Free Diameter (Å) | TEC $P_{½}(O_2)$ (torr) | Py($O_2$) (E+5 barrer) | α($O_2/N_2$) | Py($O_2$) (E+5 barrer) | α($O_2/N_2$) |
|---|---|---|---|---|---|
| 5.0 | 1.5 | 197.4 | 207.6 | 33.64 | 35.28 |
| | 7.5 | 189.9 | 199.7 | 95.41 | 100 |
| | 75 | 133.2 | 140.1 | 121.18 | 127 |
| | 150 | 100.1 | 105.3 | 95.41 | 100 |
| | 300 | 67.05 | 70.51 | 65.44 | 68.81 |
| 7.5 | 1.5 | 132.3 | 92.77 | 23.17 | 16.24 |
| | 7.5 | 127.4 | 89.27 | 64.34 | 45.1 |
| | 75 | 89.55 | 62.77 | 81.53 | 57.15 |
| | 150 | 67.50 | 47.31 | 64.34 | 45.1 |
| 10.0 | 1.5 | 100.0 | 52.58 | 18.16 | 9.54 |
| | 7.5 | 96.30 | 50.62 | 49.04 | 25.78 |
| | 75 | 67.94 | 35.71 | 61.93 | 32.55 |
| | 150 | 51.40 | 27.02 | 49.04 | 25.78 |

TABLE 4

Permeation in Microporous Membranes.
Contributions of Different Pore Sizes to Net
Permeation for a Distribution of Free Pore
Diameter.
PERMEATION IN MICROPOROUS MEMBRANES
CONDUIT MODEL

Fixed Model Parameters

Temperature 300K          $K_{14}$ = 0.1 [kPa$^{-1}$]
$O_2$ Pressure (kPa)  $N_2$ Pressure (kPa)  $P_{½}(O_2)$ = 75 torr
Up = 20  Down = 10   Up = 30  Down = 40

Variable Model Parameters

| Free Diameter (Å) | Site Footprint (Å)$^2$ | Surface Diffusion Coefficient $D_1$ (cm$^2$/sec) | | | |
|---|---|---|---|---|---|
| | | 1 E-4 | | 1 E-5 | |

PURE GAS PERMEATION & SELECTIVITY DATA

| Free Diameter (Å) | Site Footprint (Å)$^2$ | Py($O_2$) (E+5 barrer) | α($O_2/N_2$) | Py($O_2$) (E+5 barrer) | α($O_2/N_2$) |
|---|---|---|---|---|---|
| 5.0 | 100 | 67.05 | 70.50 | | |
| | 100 25% | | | 7.506 | 7.892 |
| 10.0 | 100 | 34.86 | 18.32 | | |
| | 100 50% | | | 5.088 | 2.674 |
| 15.0 | 100 | 24.72 | 8.659 | | |
| | 100 20% | | | 4.875 | 1.707 |
| 20.0 | 100 | 20.10 | 5.278 | | |
| | 100 5% | | | 5.214 | 1.369 |
| For the indicated pore distribution | | 40.14 | 20.58 | 5.656 | 2.900 |

The table reproduced in Table 1 illustrates the impact of free pore diameter, site footprint, and oxygen surface diffusion coefficient on the oxygen permeability and the separation factor $\alpha(O_2/N_2)$ of the conduit for a synthetic air feed consisting of 20 kPa $O_2$ and 80 kPa $N_2$, and with a site affinity coefficient of 150 torr. The downstream pressure is set at 1 kPa $O_2$ and 0 kPa $N_2$. Simulations for alternative feed and product pressures show similar trends. These simulations indicate that increasing the TEC footprint or increasing the free pore diameter leads to a reduction in oxygen permeability and separation factor of the conduit. In addition, it is evident that higher surface diffusion coefficients result in increased oxygen permeabilities and separation factors. As an example, a microporlous oxygen selective membrane incorporating a close-packed arrangement of TEC's with footprint 250 $(Å)^2$ and an oxygen affinity coefficient $P_{1/2}(O_2)$, of 150 torr is expected to show a conduit permeability of $2.068 \times 10^{+6}$ Barrer and a selectivity $\alpha(O_2/N_2)$ of 10.9 if a surface diffusion coefficient of $10^{-4}$ $cm^2/s$ is realized and the free pore diameter is 10 Å (see Table 1).

The conduit model has also been used to examine the permeation characteristics of a microporous membrane with a synthetic air feed (20 kPa $O_2$ and 80 kPa $N_2$), a product of 1 kPa oxygen, and using a fixed TEC footprint of 100 $(Å)^2$ (see Table 2). At fixed free pore diameter, the oxygen permeability and separation factor can be optimized by choice of affinity coefficient (expressed as $P_{1/2}(O_2)$). It is anticipated that the optimum affinity coefficient will be dependent on the feed composition and pressure. Table 2 also illustrates that high separation factors are anticipated for small free pore diameters, high surface diffusion coefficients, and small site footprints. As an example, a microporous membrane with a free pore diameter of 10 $(Å)^2$, a $P_{1/2}(O_2)$ of 150 torr and an oxygen surface diffusion coefficient of $10^{-4}$ $cm^2/sec$, with a synthetic air feed of 20 kPa $O_2$ and 80 kPa $N_2$ is expected to show a conduit oxygen permeability of $4.904 \times 10^{+6}$ Barrer and $\alpha(O_2/N_2)$ of 25.78 based on calculations for pure gases.

The effect of product pressure on permeation characteristics for microporous membranes has been examined using a conduit model, and the results are presented in Table 3 for a site footprint of 100 $(Å)^2$ and an oxygen surface diffusion coefficient of $10^{-4}$ $cm^2/s$ as a function of free pore diameter and $P_{1/2}(O_2)$. These studies indicate that there are large differences in selectivities $\alpha(O_2/N_2)$ for downstream pressures of 1 kPa and 0 kPa oxygen for cases where the affinity coefficient of TEC sites, $P_{1/2}(O_2)$ is low, but that the difference is reduced as the $P_{1/2}(O_2)$ approaches or exceeds the upstream oxygen pressure.

Figure 5:
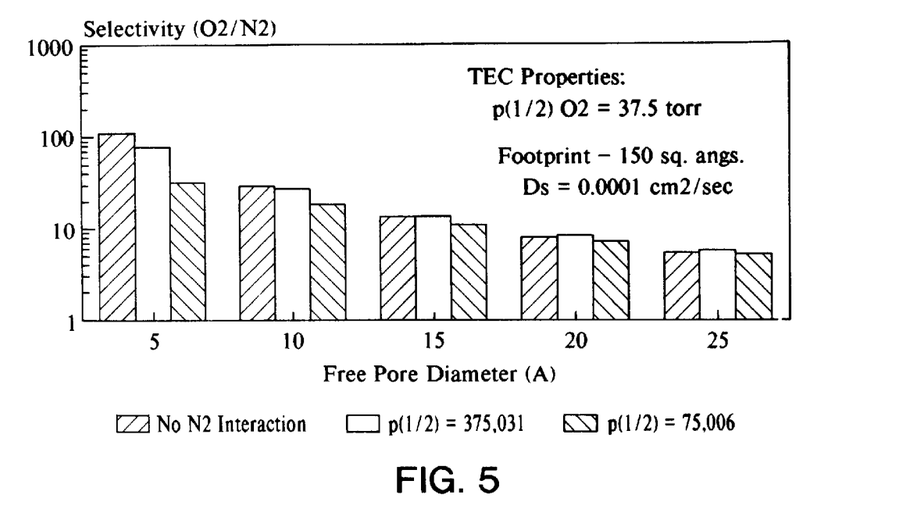
FIG. 5—Graph of free pore diameter versus selectivity ($O_2/N_2$) for microporous membranes.

Permeation characteristics predicted using a conduit model have so far neglected contributions from the surface diffusion of nitrogen. Additional studies were performed to evaluate the validity of this approaching a TEC footprint of 150 $(Å)^2$, a nitrogen footprint of 16.2 $(Å)^2$, surface diffusion coefficients of $10^{-4}$ $cm^2/s$ for oxygen and nitrogen and using free pore diameter and nitrogen affinity coefficient as variables. The results are shown graphically in FIG. 5 compared to selectivities in the absence of a nitrogen interaction. The differences in selectivities diminish with increasing free pore diameter or when $P_{1/2}(N_2)$ is large. Experimental studies of equilibrium properties for adsorbents based on TEC coated substrates confirm that nitrogen loadings are low, corresponding to large $P_{1/2}(N_2)$.

Figure 6:
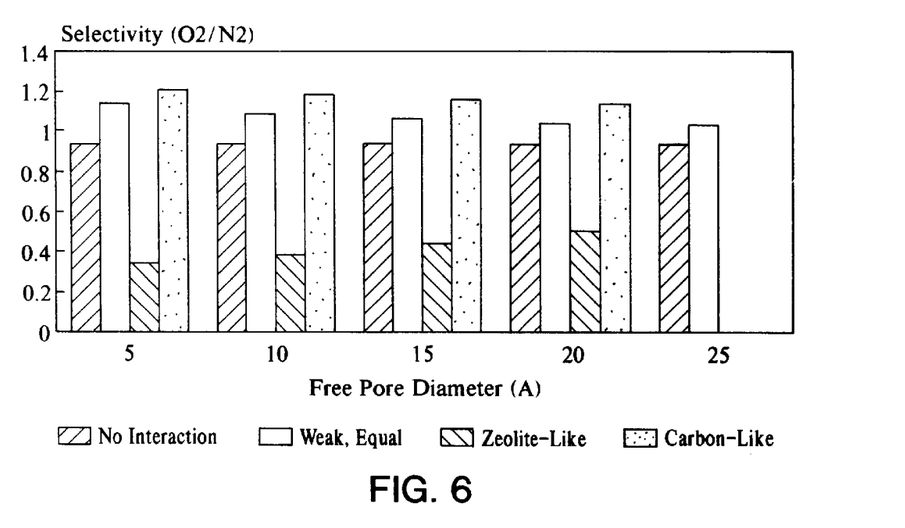
FIG. 6—Graph of free pore diameter versus selectivity ($O_2/N_2$) for microporous membranes of non-TEC systems.
Figure 7:
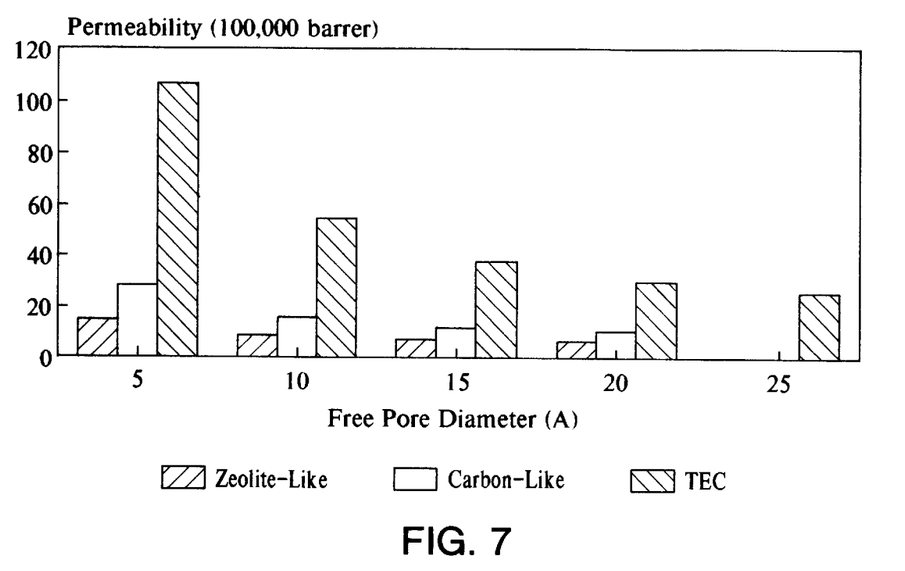
FIG. 7—Graph of free pore diameter versus permeability for microporous membranes.

In one of the preferred embodiments, the invention involves the reversible chemisorption of oxygen using organized TEC sitesion a suitable substrate to form a microporous membrane. The conduit model described here has been utilized to compare permeation characteristics for membranes containing TEC's with adsorbent membranes incorporating carbonaceous, zeolitic or similar coatings as utilized in prior art. The modeling studies for non-TEC coatings involve footprints for oxygen and nitrogen of 14.1 and 16.2 $(Å)^2$ respectively and surface diffusion coefficients of $10^{-4}$ $cm^2/s$. The interaction parameters for each adsorbate are based on equilibrium properties for known adsorbent materials. Selectivities, $\alpha(O_2/N_2)$, for membranes exhibiting physical adsorption of oxygen and nitrogen are compared in FIG. 6. In all cases, the selectivity $\alpha(O_2/N_2)$ is less than 2 which is significantly lower than for comparable TEC based materials (see FIG. 5). In addition, the oxygen permeabilities for microporous membranes incorporating surface TEC sites are compared with similar materials containing either zeolite or carbon coatings in FIG. 7. For all conditions examined, the permeabilities and selectivities for TEC coatings are substantially better than for adsorbent membranes containing zeolite or carbon coatings.

Since the majority of substrates and coating methods do not give uniform pores, the impact of pore size distribution has been examined using the conduit model. This analysis is based on a pore size distribution involving 25% pores with diameter 5 Å, 50% with diameter 10.0 Å, 20% with diameter 15.0 Å, and 5% with diameter 20.0 Å. The contributions of different sized pores to the net permeation is illustrated in Table 4 at 300K, with a TEC footprint 100 $(Å)^2$, $P_{1/2}(O_2)$ 75 torr, with a synthetic air feed (20 kPa $O_2$, 80 kPa $N_2$) and with a downstream pressure of 10 kPa oxygen and 40 kPa nitrogen. For an oxygen surface diffusion coefficient of $10^{-4}$ $cm^2/s$ the selectivity $\alpha(O_2/N_2)$ 20.58 and conduit $P(O_2)$ is $4.1 \times 10^{+6}$ Barrer.

It is evident that a small population of larger pores can have a large impact on net gas transport and obscure contributions from active surface diffusion even for highly uniform coatings. Control of pore size distribution can be addressed in part by substrate selection and synthetic methods. In addition, the use of pre- or post-treatment can be used to minimize the effects of an unfavorable pore size distribution.

The conduit pore model demonstrates that microporous membranes incorporating organized oxygen selective TEC coatings are capable of higher oxygen permeabilities and selectivities than alternative coatings which exhibit physical adsorption. The permeation characteristics of the microporous oxygen selective membranes,are dependent on a number of features, and best performance is anticipated for small free pore diameters less than 25 Å, preferable 20 Å and most preferably less than 15 Å with a narrow pore size distribution (preferable uniform) involving close-packed arrangements of TEC's which possess small site footprints preferably less than 200 $(Å)^2$ and most preferably less than 100 $(Å)^2$ and high oxygen surface diffusion coefficients preferably greater than $1 \times 10^{-5}$ $cm^2/s$ and more preferably greater than $1 \times 10^{-4}$ $cm^2/s$. In all cases, the thickness of the separation layer should preferably be kept at a minimum (preferable less than 2000 Å and most preferably less than 1000 Å). The $P_{1/2}(O_2)$ TEC sites and the feed product pressures should be optimized for the required separation.

The conduit model was developed to describe permeation in straight, uniform pores. However, adjustments can be made to account for surface porosity and to accommodate tortuosity. Where possible, microporous oxygen selective membranes with straight uniform pores are preferred.

One embodiment of the subject invention provides highly desirable oxygen-selective microporous membranes incorporating supported TEC's preferably in the solid phase capable of enhancing utilization and sorption rates. Thus, the microporous membranes with TEC of the invention are highly advantageous for practical commercial operations.

Although the invention has been described with reference to specific embodiments as examples, it will be appreciated that it is intended to cover all modifications and equivalents within the scope of the appended claims.

What is claimed is:

1. A selected gas-selective microporous membrane having a surface diffusion of a selected gas using-selective sites which are selective at equilibrium employing reversible chemisorption and wherein said microporous membrane has a pore size of less than about 25 Å; and said selected gas selective sites have a footprint of less than about 200 $(\text{Å})^2$.

2. The selected gas-selective microporous membrane of claim 1 wherein said selected gas is selected from the group comprising oxygen, carbon dioxide and carbon monoxide.

3. The selected gas-selective microporous membrane of claim 2 wherein said selected gas is oxygen and said selective sites are transition element complex sites.

4. The selected gas-selective microporous membrane of claim 3 wherein said transition element complex sites are selected from the group comprising (1) metal ions selected from the group comprising cobalt(II), nickel(II) iron(II), copper(I), and mixtures thereof; (2) ligands selected from the group comprising porphyrins, Schiff bases, polyamines, polyoxoamides, oximes, cyclidenes and their derivatives; and (3) axial bases selected from the group comprising nitrogen, sulfur, oxygen and heterocycles, thioethers, pyridine, imidazole amines, epoxides, ethers, land their derivatives.

5. The selected gas-selective microporous membrane of claim 2 wherein the selected gas is carbon dioxide and said selective sites are selected from the group comprising amines, exposed cations and mixtures thereof.

6. The selected gas-selective microporous membrane of claim 2 wherein said selected gas is carbon monoxide and said selective sites are selected from the group comprising copper (I), silver (I) and mixtures thereof.

7. The selected gas-selective microporous membrane of claim 2 wherein said microporous membrane has a pore size of less than 10 Å.

8. The selected gas-selective microporous membrane of claim 7 wherein said selective sites have a footprint of less than 100 $(\text{Å})^2$.

9. The selected gas-selective microporous membrane of claim 8 wherein said microporous membrane has a selected gas surface diffusion coefficient of greater than $1 \times 10^{-5}$ cm$^2$/s.

10. The selected gas-selective microporous membrane of claim 9 wherein the thickness of the selected gas-selective membrane is less than 2000 Å.

11. The selected gas-selective microporous membrane of claim 10 wherein said selective sites is a monolayer on said microporous membrane.

12. The selected gas-selective microporous membrane of claim 11 wherein said selected gas is oxygen.

13. The selected gas-selective microporous membrane of claim 2 wherein said selective sites have a footprint of less than 100 $(\text{Å})^2$.

14. The selected gas-selective microporous membrane of claim 2 wherein said microporous membrane has a selected gas surface diffusion coefficient of greater than $1 \times 10^{-5}$ cm$^2$/s.

15. The selected gas-selective microporous membrane of claim 2 wherein the thickness of the selected gas-selective membrane is less than 2000 Å.

16. The selected gas-selective microporous membrane of claim 2 wherein said selective sites are distributed as a monolayer on said microporous membrane.

17. The selected gas-selective microporous membrane of claim 2 wherein the microporous membrane is in a form selected from the group comprising a flat disk, tube, hollow fiber, and spiral wound member.

18. A process of making a selected gas-selective microporous membrane comprising the steps of (a) forming a microporous membrane having pore size of less than 25 Å and substantially removing any water and any other undesired adsorbed specie;

(b) preparing a solution containing selected gas-selective sites;

(c) contacting said microporous membrane with said solution of step (b) and controlling the selective sites in the solution so that said selective sites have a footprint of less than about 200 $(\text{Å})^2$ deposited on said microporous membrane; and removing solvent to produce a selective sites coated microporous membrane.

19. The process of claim 18 wherein the process is performed under anaerobic conditions.

20. The process of claim 18 wherein the solution of step (b) contains at least one linking agent.

21. The process of claim 18 wherein prior to step (c) the following step is added:

(c') preparing a solution containing at least one linking agent and contacting said microporous membrane with said solution to coat said microporous membrane with said linking agent.

22. The process of claim 18 wherein the microporous membrane has a pore size of less than 10 Å.

23. The process of claim 18 wherein said selective site has a footprint of less than 100 $(\text{Å})^2$.

24. The process of claim 18 wherein the thickness of the microporous membrane is less than 2000 Å.

25. The process of claim 18 wherein the selective sites are deposited as a monolayer.

26. The process of claim 18 wherein said selected gas is selected from the group comprising oxygen, carbon dioxide and carbon monoxide.

27. The process of claim 18 wherein said selected gas is oxygen and said selective sites are transition element complex sites.

28. The process of claim 27 wherein the transition element complex sites are deposited as a monolayer.

29. The process of claim 18 wherein said selected gas is carbon monoxide and said selective sites are selected from the group comprising copper (I), silver (I) and mixtures thereof.

30. A process for making a selected gas-selective microporous membrane comprising the preparing of selected gas-selective sites in particle form and forming a sol-gel membrane with said selective sites particles in situ to produce a selected gas-selective microporous membrane wherein the membrane has a pore size of less than 25 Å, and the surface diffusion of the selected gas-selective sites have a footprint of less than about 200 $(\text{Å})^2$.

31. The process of claim 30 wherein linking agent particles are prepared and said linking agent particles along with the selective sites particles are used to form in situ the microporous membrane.

32. The process of claim 30 wherein said selected gas is selected from the group comprising oxygen, carbon dioxide and carbon monoxide.

33. The process of claim 30 wherein said selected gas is oxygen and said selective sites are transition element complex sites.

34. The process of claim 30 wherein the selected gas is carbon dioxide and said selective sites are selected from the group comprising amines, exposed cations and mixtures thereof.

35. The process of claim 30 wherein said selected gas is carbon monoxide and said selective sites are selected from the group comprising copper (I), silver (I) and mixtures thereof.

* * * * *